United States Patent
Lea et al.

(10) Patent No.: US 10,210,642 B2
(45) Date of Patent: Feb. 19, 2019

(54) REPRESENTING AN EDIT

(71) Applicant: Hewlett-Packard Development Company, L.P., Houston, TX (US)

(72) Inventors: Perry V Lea, Eagle, ID (US); Steven Holland, Boise, ID (US); Bradley R Larson, Meridian, ID (US); John D Wilcox, Jr., Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 101 days.

(21) Appl. No.: 15/327,915

(22) PCT Filed: Jul. 28, 2014

(86) PCT No.: PCT/US2014/048404
§ 371 (c)(1),
(2) Date: Jan. 20, 2017

(87) PCT Pub. No.: WO2016/018213
PCT Pub. Date: Feb. 4, 2016

(65) Prior Publication Data
US 2017/0213370 A1 Jul. 27, 2017

(51) Int. Cl.
*G06T 11/60* (2006.01)
*G06F 3/0484* (2013.01)
*G06Q 50/10* (2012.01)

(52) U.S. Cl.
CPC .......... *G06T 11/60* (2013.01); *G06F 3/04845* (2013.01); *G06Q 50/10* (2013.01); *G06T 2200/24* (2013.01)

(58) Field of Classification Search
CPC .. G06F 3/04845; G06T 11/60; G06T 2200/24

USPC .......................................................... 345/581
See application file for complete search history.

(56) References Cited

U.S. PATENT DOCUMENTS

| 6,697,061 | B1 | 2/2004 | Wee et al. |
| 7,212,217 | B1 | 5/2007 | Feather et al. |
| 7,542,160 | B2 | 6/2009 | Parry et al. |
| 7,864,199 | B2 | 1/2011 | Utsunomiya et al. |

(Continued)

FOREIGN PATENT DOCUMENTS

| EP | 0527097 | 2/1993 |
| EP | 1385104 A2 | 1/2004 |

(Continued)

OTHER PUBLICATIONS

Sharp, "MX-5141N/4141N For Productivity That Begins with Touchscreen Ease, Scanning Efficiency, and Access on the Move," Sep. 27, 2013—http://www.sharp-world.com/ 2 pages.

(Continued)

*Primary Examiner* — Kimberly A Williams
(74) *Attorney, Agent, or Firm* — Trop Pruner & Hu PC

(57) ABSTRACT

Information relating to a user input to edit a portion of an image is received, A where the image is divided into a plurality of tiles. In response to the received information, at least one further tile in a representation of the edit is created. A data structure including entries that link the plurality of tiles and the at least one further tile is created. The at least one further tile with the plurality of tiles are combined to produce an output page that includes the image with the edit applied to the image.

20 Claims, 5 Drawing Sheets

(56) References Cited

U.S. PATENT DOCUMENTS

| | | |
|---|---|---|
| 7,911,626 B2 | 3/2011 | Ferlitsch |
| 8,433,909 B1 | 4/2013 | Sakkos et al. |
| 2002/0071615 A1 | 6/2002 | Kobayashi et al. |
| 2004/0175047 A1* | 9/2004 | Gormish ............ H04N 7/17318 382/232 |
| 2004/0179740 A1* | 9/2004 | Yasuhiro, II ............ G06T 11/60 382/232 |
| 2005/0169542 A1* | 8/2005 | Yano .................... G11B 27/034 382/232 |
| 2006/0244858 A1 | 11/2006 | Nam et al. |
| 2007/0253628 A1* | 11/2007 | Brett ...................... H04L 67/06 382/232 |
| 2007/0253640 A1* | 11/2007 | Brett ...................... G06T 11/60 382/276 |
| 2008/0143742 A1 | 6/2008 | Jeong et al. |
| 2009/0096808 A1* | 4/2009 | Winn ...................... G06T 11/60 345/594 |
| 2009/0202179 A1* | 8/2009 | Shivanna .............. G06F 19/321 382/311 |
| 2010/0002096 A1 | 1/2010 | Hong |
| 2010/0034473 A1* | 2/2010 | Sadasue ................. H04N 19/44 382/232 |
| 2010/0118327 A1 | 5/2010 | Caspar et al. |
| 2013/0093769 A1 | 4/2013 | Fagans |
| 2013/0120439 A1 | 5/2013 | Harris et al. |
| 2013/0162678 A1* | 6/2013 | Harris ...................... G09G 5/00 345/634 |

FOREIGN PATENT DOCUMENTS

| | | |
|---|---|---|
| EP | 2660774 A1 | 11/2013 |
| KR | 20050030485 | 3/2005 |

OTHER PUBLICATIONS

Siedelmann, H., "Scale-Invariant Image Editing," (Research Paper), Apr. 1, 2012—87 pages.

Wikipedia, Adobe Photoshop dated Jul. 2014 (10 pages).

* cited by examiner

REPRESENTING AN EDIT

BACKGROUND

A user can edit a portion of an image by using an input device. Examples of input devices include a stylus, a touch screen display device, a mouse device, a keyboard, and so forth. Editing an image can include adding an element to the image, or modifying an element that is already part of the image.

BRIEF DESCRIPTION OF THE DRAWINGS

Some implementations are described with respect to the following figures.

DETAILED DESCRIPTION

Figure 1:
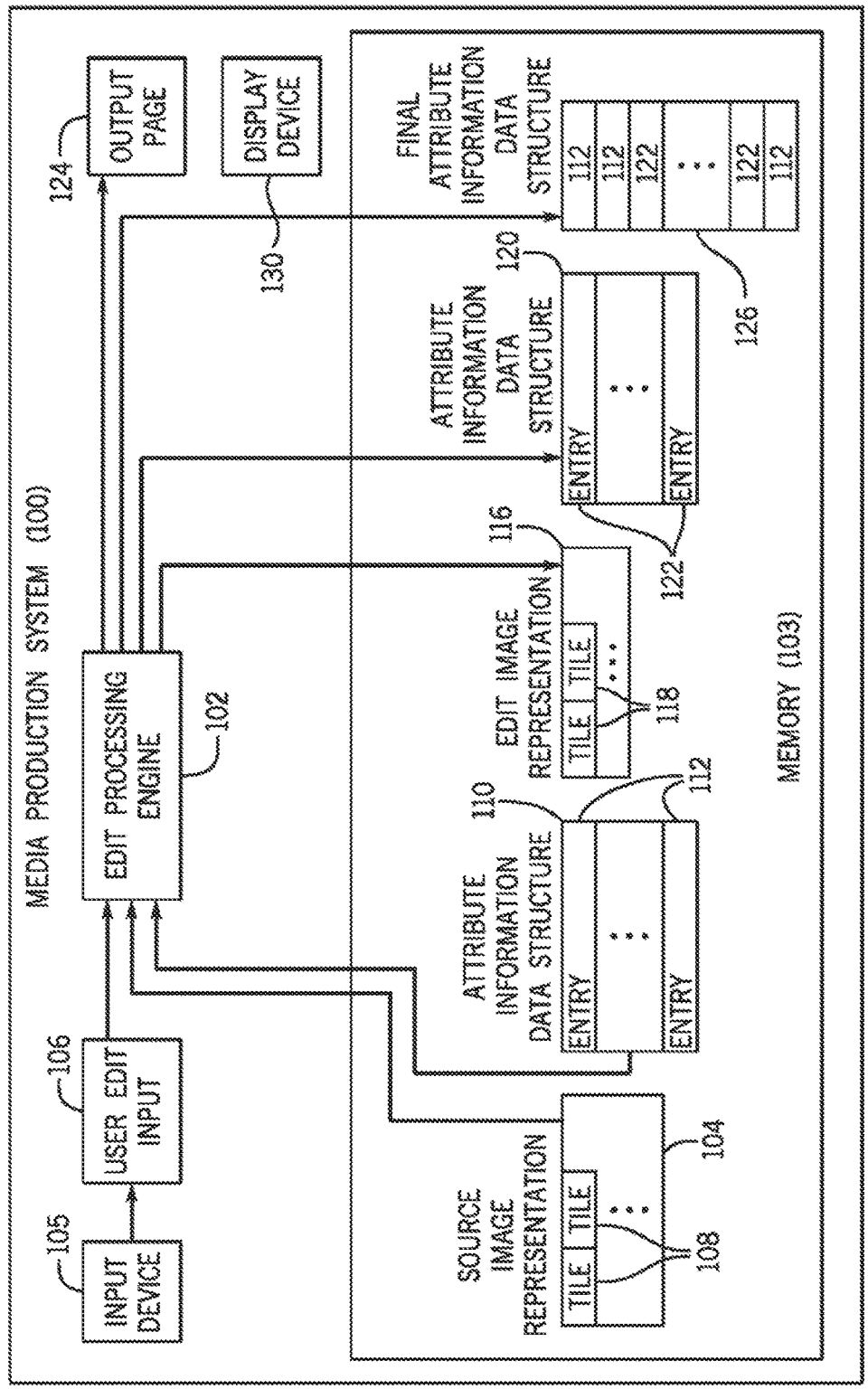
FIG. 1 is a block diagram of an example media production system according to some implementations.

An image of an object can be captured by, an image capture device, such as a camera, a scanner, and so forth. Examples of objects include documents, persons, or other types of objects. An image can also be formed using image creation tools, such as off-the-shelf application programs or customized application programs.

A user can make an edit in an image. As some examples, a user can add a marking to the image (such as an image of a document), where, the marking can be a human signature, a human initial, or any other graphical element or text that can be added to the image. Examples of documents into which human signatures or initials can be entered can include legal documents, medical documents, professional engineering documents, financial documents, and so forth.

As further examples, a user can also edit an existing element in the image, where the edit can include rotating the element, cropping the element, replacing the element with another element, redacting portions of the image (such as by drawing a thick dark line over a portion of the image), highlighting portions of the image (such as by making color marks on a portion of the image), and so forth.

Traditionally, when making an edit to an image, the entire image is processed. As an example, if the image is stored in compressed form, then the entire image is decompressed, and the edit is applied to the decompressed image. Having to process an entire image (e.g. decompress the image), particularly a high resolution image, to make an edit can be processing and storage intensive.

Also, traditionally, once an edit is made, the edit is integrated with a source image to produce a modified image. The edit may thus not be portable to other images. Moreover, once an edit is made with respect to a source image, the source image may no longer be available, if the modified image replaces the source image.

In accordance with some implementations, to improve efficiency when editing a source image, techniques or mechanisms are provided to allow a representation of an edit to be provided as a set of tiles that is separate from another set of tiles that corresponds to the source image. The source image is divided into multiple tiles, such as an array of tiles. A "tile" can refer to a portion or subregion of an image. The tiles can have the same size, or alternatively, at least some of the tiles can have irregular sizes and/or shapes that differ from those of other tile(s). At least some of the tiles are non-overlapping tiles (in other words, one the does not overlap any part of another tile), in some examples, the tiles are in a two-dimensional array with no overlap between the tiles. In other examples, some of the tiles may overlap.

The edit itself is also another image (the "edit image"), which can be divided into tiles (note that in some cases, the edit image can be made up of just one tile, if the edit is applied within a region that fits within one tile).

The set of tiles for the source image and the set of tile(s) for the edit image can be combined, to form a page that includes the source image and the edit image. A page can refer to a digital representation that contains one or multiple images.

In this manner, when applying an edit to a portion of the image, processing and storage resource usage can be made more efficient, since all tiles of the source image would not have to be decompressed when making the edit. Moreover, the edit is portable and can be applied to other images. Additionally, if desired, a user can readily recreate the source image, prior to the application of the edit, since the representation of the edit is stored separately from the tiles that make up the source image.

FIG. 1 is a block diagram of an example media production system 100 according to some examples. A media production system can include a printer (e.g. a multi-function printer that includes a scanner and a printing unit, or a printer without scanning functionality), a camera, a handheld computing device (e.g. a smartphone, a personal digital assistant, etc.), a computer (e.g. a tablet computer, a notebook computer, a desktop computer, a server computer, etc.), or any other system that is able to produce an image for output, such as printing, displaying, storing, communicating, etc. A "system" can refer to an electronic device, an arrangement of electronic devices, a processor, an arrangement of processors, and so forth.

The media production system 100 includes an edit processing engine 102 that is able to receive a source image representation 104 and a user edit input 106, where the user edit input 106 specifies a edit to be, applied to a source image represented by the source image representation 104.

In the ensuing discussion, an "engine " as discussed in the present disclosure may include hardware or a combination of hardware and programming to implement the functionalities of the respective engine. Such combinations of hardware and programming may be implemented in a number of different ways. For example, the programming for an engine may include executable instructions stored on a non-transitory machine-readable storage medium and the hardware for the engine may include processor(s) to execute those instructions. In such examples, the machine-readable storage medium may store instructions that, when executed by the processor(s), implement functionalities of the engine. A processor can include a microprocessor, microcontroller, programmable integrated circuit, programmable gate array, or any combination of the foregoing.

Also, although reference is made to the edit processing engine 102 in the singular sense, note that the edit processing engine 102 can be made up of multiple engines.

The user edit input 106 is received based on user manipulation of an input device 105, such as a stylus, a touch screen display device, a touchpad, a mouse device, a keyboard, or any other input device. If the input device 105 is a touch-based device (e.g. touch screen display device or touchpad), the touch-based device can use infrared (IR) sensing, capacitive touch sensing, resistive touch sensing, or another technology.

The source image representation 104 is a representation of the source image that includes a set of tiles 108. Previous processing was applied on the source image to produce the set of tiles 108 in the source image representation 104. The set of tiles 108 can be stored in a memory 103 of the media production system 100. Each tile 108 can be compressed and stored in compressed form. Although FIG. 1 shows the memory 103 as a block, it is noted that the memory 103 can refer to one or multiple memory devices.

FIG. 1 also shows an attribute information data structure 110 that includes multiple entries 112 that correspond to the tiles 108 of the source image representation 104. In some examples, the attribute information data structure 110 is referred to as a Table of Contents (ToC) for the source image representation 104. Each entry 112 can store attribute information or metadata for the respective tile 108. The metadata can specify the arrangement of the respective tile, such as a position of the tile in an image, an orientation of the tile in the image, and other attributes of the tile. The position of the tile can be specified as an offset from a base address associated with the image. Different offsets correspond to different relative positions in the image from the base address. By including the offsets in the respective entries 112, the corresponding tiles 108 can be appropriately arranged in the image. The orientation of a tile can refer to a rotation angle of the tile, whether the tile is flipped along a vertical axis or horizontal axis, or any other information relating to how the tile is oriented in the image.

The attribute information data structure 110 can also include linking information, to link one the 108 to another tile 108. The linking information in the respective entries 112 allows for the tiles 108 to be linked together, such that an image having a specific arrangement and order of the tiles 108 can be formed.

In response to the user edit input 106, the edit processing engine 102 can produce a representation of the edit (depicted as an edit image representation 116 in FIG. 1). The edit image representation 116 represents an edit image that corresponds to the edit made by the user edit input 106. For example, a marking (e.g. human signature, initial, etc.) can be added, and this marking is an edit image that is represented by the edit image representation 116. Alternatively, an element of the source image may have been modified, and the modified element is represented as the edit image. The edit image can be divided into a set of tiles 118 that are part of the edit representation 116. The tiles 118 can also be compressed and stored in the memory 103 of the media production system 100 in compressed form.

The edit processing engine 102 can also produce another attribute information data structure 120 that includes entries 122 that contain metadata for the tiles 118 of the edit image representation 116. In some examples, the attribute information data structure 120 is a ToC for the edit image representation 116. The metadata in the entries 122 of the attribute information data structure 120 are similar to the metadata in the entries 112 of the attribute information data structure 110 for the source image representation 104.

In examples where the edit image representation 116 includes just one tile 118, then the respective attribute information data structure 120 also includes just one entry 122.

The source image representation 104, the attribute information data structure 110, the edit image representation 116, and the attribute information data structure 120 can be stored in the memory 103 of the media production system 100.

Prior to outputting a page that contains the source image and edit image, it is noted that the tiles 118 of the edit image representation 116 can be kept separately from the tiles 108 of the source image representation 104.

At the time that an output page is to be produced that includes the edited source image (based on the user edit input 106), the edit processing engine 102 can combine the source image representation 104 and the edit image representation 116 to produce an output page 124.

To combine the source image representation 104 and the edit image representation 116, the attribute information data structures 110 and 120 (or ToCs) for the source image and the edit image are linked together. For a given output page that has multiple images, the respective attribute information data structures are linked together, by including linking information in the respective entries. Linking information is inserted into certain entries 112 of the attribute information data structure 110 to point to respective entries 122 of the attribute information data structure 120, depending on respective positions of image portions of the source image and the edit image in the output page 124. By linking the attribute information data structures of the images, the images can be properly arranged in the output page 124.

Linking together the attribute information data structures 110 and 120 forms an output attribute information data structure 126, which includes the entries 112 and 122 of the attribute information data structures 110 and 120 in appropriate order. The output attribute information data structure 126 is used to form the output page 124, by retrieving the respective tiles 108 and 116 of the source image representation 104 and edit image representation 116, decompressing the tiles, and arranging the decompressed tiles in the output page 124 in the positions and order specified by the entries of the output attribute information data structure 126. Note that there may be other tasks (e.g. masking, contrast adjustments, tile modifications, etc.) between the decompressing and the arranging.

The output page 124 can there be output, such as printed, displayed, stored, communicated, and so forth.

In the foregoing examples, reference is made to one edit and the respective edit image. It is also possible that multiple edits can be made to a source image, such as to add multiple human signatures and/or initials. Each of the multiple edits can be represented by a respective edit image, which in turn is represented by a respective edit image representation and corresponding attribute information data structure. The multiple edit images can be combined with the source image, by linking together the entries of the respective attribute information data structures to properly order and arrange the tiles of the source image representation and edit image representations.

As noted above, the edit image representation 116 is stored in the memory 103 separately from the source image representation 104. As a result, the edit image representation 116 is portable and can be applied to other source images, such as images of other documents. For example, a human signature can be represented in an edit image representation, and this signature can be applied to multiple documents.

In addition, since the edit image representation 116 is stored separately from the source image representation 104, the original source image (without the edit) can be readily produced by the media production system 100 if requested, In some examples, the edit image represented by the edit image representation 116 can be modified. For example, a signature can be rotated, stretched, or transformed to fit into an area of a source image. The modified edit image representation can be stored back to the memory 103. In addition to modifying an edit, a user can also choose to remove a previously made edit.

The edit image representation 116 (and the respective attribute information data structure 120) can be securely stored. For example, the edit image representation 116 (and the respective attribute information data structure 120) can be encrypted using a key or other security item, such that only an authorized user would be able to retrieve the edit image representation 116 (and the respective attribute information data structure 120) for application to a source image. This security feature prevents an unauthorized person from retrieving the edit image representation 116 for application to a document.

In some examples, the media production system 100 can allow for a preview of the source image in a display device 130 of the media production system 100. The previewed image can be of just a portion of the source image that is subject to edit. A user can apply an edit with respect to the previewed image. Previewing of the source image can be performed by a preview application, which can include machine-readable instructions that are part of the edit processing engine 102 or separate from the edit processing engine 102. The preview application can also be used to modify an edit, or to remove a previously applied edit.

Previewing an image can be performed at a display resolution of the display device 130. Typically, display resolutions are smaller than printer resolutions. As examples, a high resolution display device can display an image at a display resolution of up to 100 dots per inch (dpi). However, a printer can print an image at a printer resolution of 600 dpi to 1,200 dpi, for example. Thus, the previewed image has a resolution that can be much less than the resolution used for printing.

By representing an image with a set of tiles, the previewing application can apply scaling to the image (that has a higher resolution, such as at the printer resolution) to a lower resolution (such as a display resolution). The scaled image can then be displayed for preview. Any edits made with respect to the displayed image can be resolved to a higher resolution if desired. In some examples, multiple copies of an image (e.g. a higher resolution image for printing and a lower resolution image for display) do not have to be stored. Instead, just a single copy of the image (higher resolution copy) is stored, with scaling applied as appropriate.

Edit image representations can also be communicated from the media production system 100 to an external storage system, such as a storage system of a file server, a database server, a cloud server, and so forth.

Figure 2:
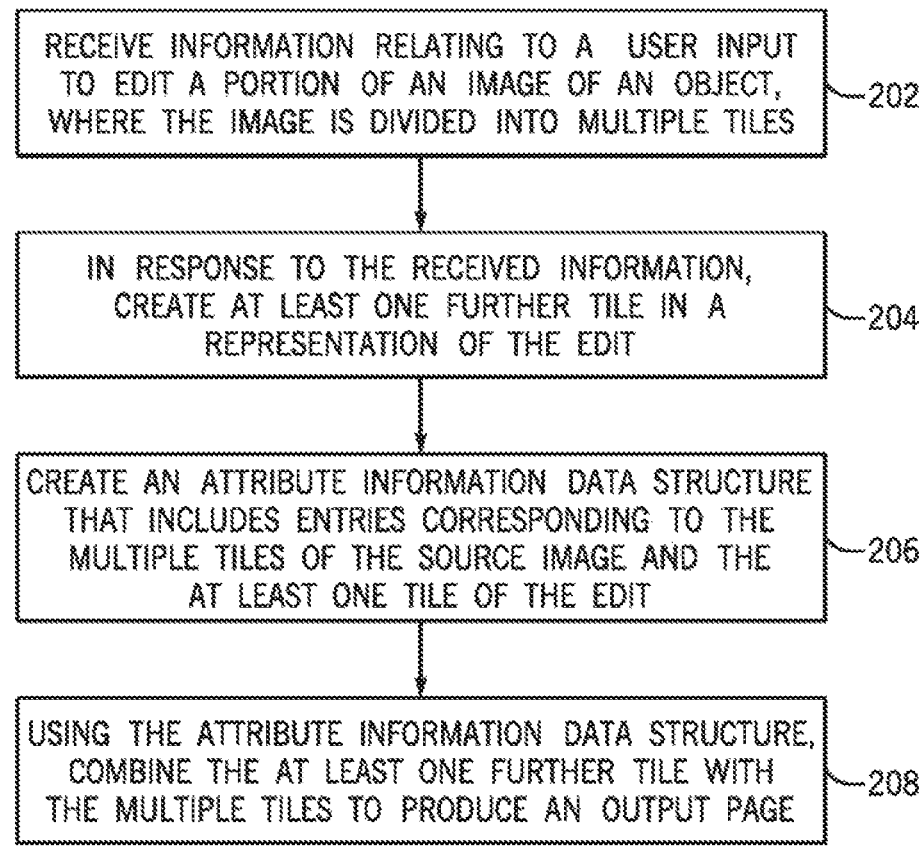
FIG. 2 is a flow diagram of an example process according to some implementations.

FIG. 2 is a flow diagram of an example process according to some implementations. The process of FIG. 2 can be performed by the edit processing engine 108 of FIG. 1, for example. The edit processing engine 102 receives (at 202) information relating to a user input to edit a portion of a source image of an object, where the source image is divided into multiple, tiles (e.g. tiles 108 in FIG. 1) at least two of which are non-overlapping. In response to the received information, the edit processing engine 102 creates (at 204) at least one further tile (e.g. 118) in a representation of the edit.

The edit processing engine 102 further creates (at 206) an attribute information data structure (e.g. data structure 126 in FIG. 1) that includes entries corresponding to the multiple tiles of the source image and the at least one further tile of the edit. The attribute information data structure is useable to form an output page that contains both the source image and the edit.

Using the attribute information data structure, the edit processing engine 102 combines (at 208) the at least one further the with the multiple tiles to produce the output page (e.g. 124 in FIG. 1) that includes the source image with the edit applied to the source image.

In further implementations, a system can include an engine to create an edit image divided into a first set of tiles, an engine to create a first attribute information data structure including entries containing metadata for respective tiles of the first set of tiles, an engine to create a second attribute information data structure including entries containing metadata for respective tiles of a second set of tiles, the source image divided into the second set of tiles, and an engine to create a page combining the source image and the edit image using the first and second attribute information data structures.

Figure 3:
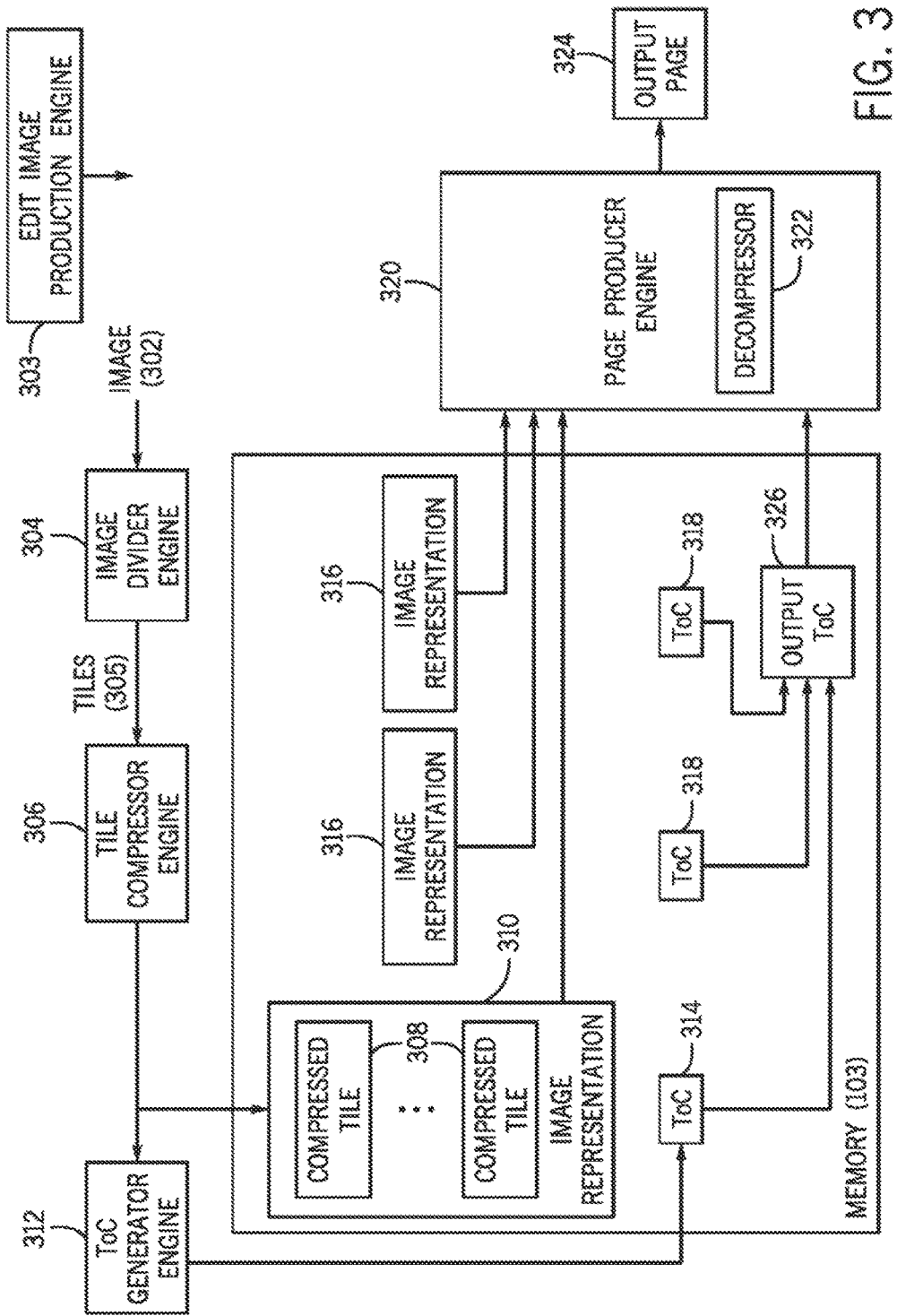
FIG. 3 is a block diagram of a media production system according to further implementations.

FIG. 3 is a block diagram of various engines that can he part of the edit processing engine 102, or that can be used with the edit processing engine 102 of FIG. 1. An in 302 can be provided to an image divider engine 304, which divides the image 302 into tiles 305. The image 302 can be an edit image produced by an edit image producing engine 303, such as in response to the user edit input 106 of FIG. 1. In other examples, the image 302 can be a source image, such as one produced by an image capture device (e.g. a camera, a scanner, etc.), or produced by an image creation tool.

The tiles 305 generated by the image divider engine 304 are provided to a tile compressor engine 306. The tile compressor engine 306 compresses the tiles to reduce the size of each of the tiles. In other words, the compressed tile can include less information than the respective portion of the image 304. The compressed tiles 308 are stored in the memory 103, as part of an image representation 310 for the image 302.

A ToC generator engine 312 produces a ToC 314 (an example of the attribute information data structure 110 or 120 of FIG. 1) that links the tiles of the image 302. The ToC 314 produced by the ToC generator engine 312 includes metadata for the respective tiles, as discussed further above.

The memory 103 of FIG. 3 also stores image representations 316 of other images, which are associated with other respective ToCs 318.

A page producer engine 320 can produce an output page 324 that combines multiple images represented by the image representations 310 and 316. The page producer engine 320 can include a decompressor 322 to decompress the compressed tiles 308 (as well as compressed tiles of the other image representations 316).

The page producer 320 can link together the ToCs 314 and 318 for the different images contained in the output page 324, using a process similar to the process of linking multiple attribute information data structures discussed above. Linking the ToCs together forms an output ToC 326, which is used by the page producer engine 320 to arrange the decompressed tiles of the image representations 310 and 316 in the output page 324, where the arranged tiles are in an order based on the entries of the output ToC 326.

In addition to arranging decompressed tiles in the output page 324, the page producer engine 320 can also apply processing on each tile based on metadata in an entry of the output ToC 326. By way of example, the processing applied on the tile can include one or some combination of the following: rotation of the tile, vertical/horizontal mirroring of the tile, alpha blending of the tile with a background image, cropping of the tile, and so forth.

Vertical/horizontal mirroring of the tile can refer to flipping the tile along the vertical or horizontal axis. Alpha blending the tile with a background image can refer to combining a translucent foreground color with a background color, to produce a new blended color. Cropping the tile refers to removing an outer part of an image portion represented by the tile.

In further examples, masking can also be employed. If mask data is provided, the page producer engine 320 can use the mask data to decide whether specific pixels of each tile are to be selected for inclusion or exclusion in producing the output image. Other example image processing operations can also be applied in other examples.

Figure 4:
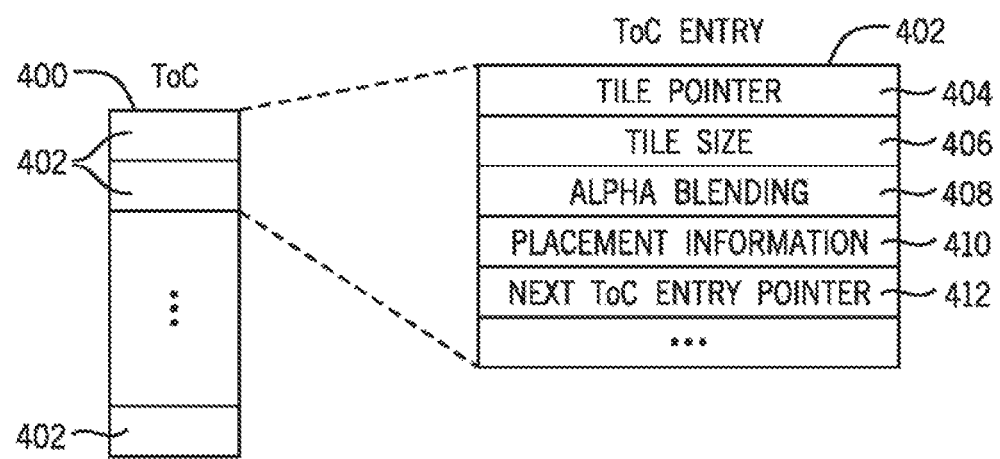
FIG. 4 is a schematic diagram of an example table of contents and entries of the table of contents, according to some implementations.

FIG. 4 is a schematic diagram of an example ToC 400 for a respective image. The ToC 400 includes multiple entries 402 (referred to as "ToC entries"). Each ToC entry 402 corresponds to a respective tile of an image. The ToC entry 402 includes various elements, including a tile pointer element 404, which can include a tile pointer that points to a compressed tile (e.g. 308) stored in the memory 310 (FIG. 3).

Another element of the ToC entry 402 is a tile size element 406, which specifies the size of the respective tile (which can be a compressed tile). An alpha blending element 408 in the ToC entry 402 specifies whether or not aloha blending is to be applied.

A placement information element 410 in the ToC entry 402 specifies a placement of the respective tile in an image. For example, the placement information 410 can be expressed in the form of an offset from a base address for the image or a portion of the image.

The ToC entry 110 also includes a next ToC entry pointer element 412 that stores a pointer to the next ToC entry. The next ToC entry pointer element 412 identifies the ToC entry for the next tile. The next ToC entry pointers in respective ToC entries 402 allow linking of tiles of an image.

In examples where multiple images (associated with respective ToCs) are combined in a page, then the ToC entries 402 of the multiple ToCs can be linked together, using the next ToC entry pointer elements 412. More specifically, to link multiple images in a page, a ToC entry of the ToC associated with a first page contains a pointer to the next ToC entry that is part of another ToC associated with a second page.

Figure 5:
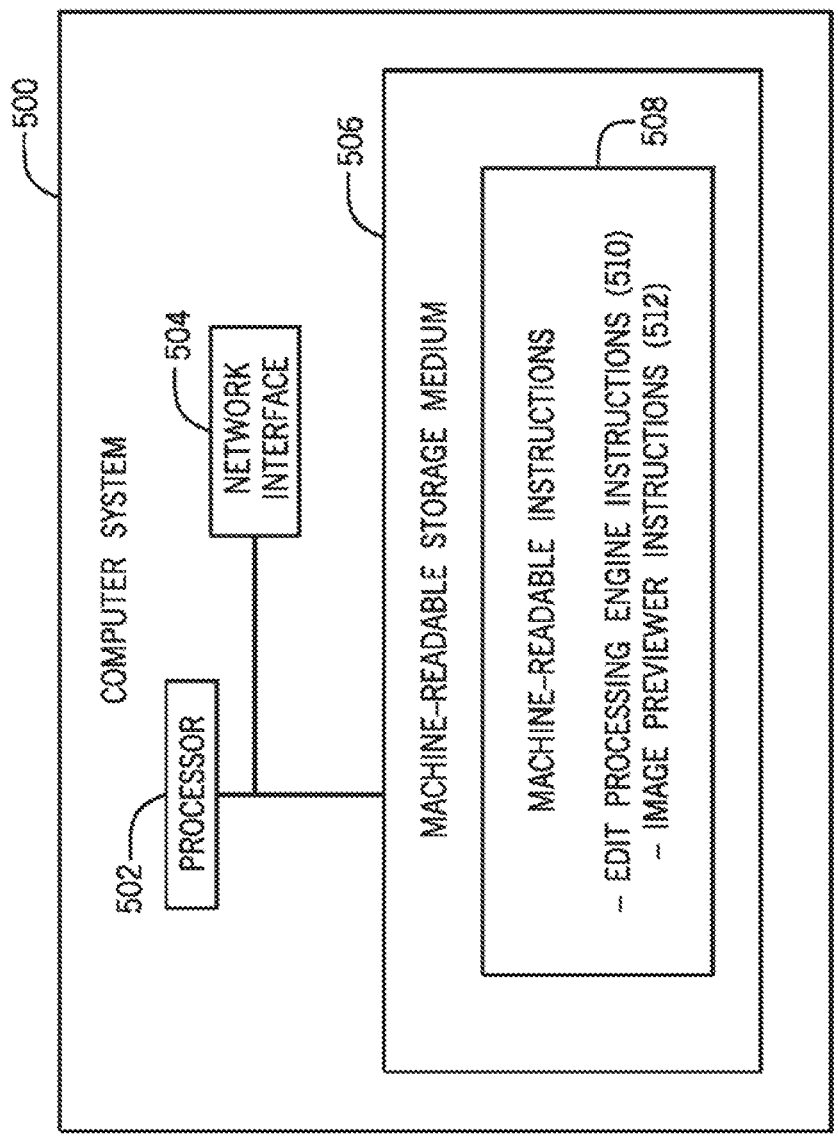
FIG. 5 is a block diagram of an example computer system according to some implementations.

FIG. 5 is a block diagram of an example computer system 500, according to some examples. The computer system 500 can be used to implement a media production system (such as shown in FIG. 5). The computer system 500 includes one or multiple processors 502, which is coupled to a network interface 504 to allow the computer system 500 to communicate over a network, and a non-transitory machine-readable storage medium (or storage media) 506. The storage medium (or storage media) 506 can store machine-readable instructions 508, which can include one or some combination of instructions associated with various engines discussed above in connection with FIG. 1 or 3. For example, the machine-readable instructions 508 can include instructions 510 of the edit processing engine, instructions 512 of an image previewer (e.g. preview application discussed above) that can allow a user to input edits, and instructions of the other engines discussed above.

The storage medium (or storage media) 506 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be, practiced without some of these details. Other implementations may include modifications arid variations from the details discussed above. It is intended that the appended claims cover such modifications and variations.

What is claimed is:

1. A method comprising:
  receiving, by a system including a processor, information relating to a user input to edit a portion of an image of an object, wherein the image is divided into a first set of tiles at least two of which are non-overlapping, and the image is represented by a first data structure including entries comprising metadata for respective tiles of the first set of tiles;
  in response to the received information, creating, by the system, an edit image divided into a second set of tiles, and creating a second data structure including entries comprising metadata for respective tiles of the second set of tiles;
  creating, by the system, an output data structure by linking the entries of the first data structure and the entries of the second data structure, the output data structure including entries that contain respective metadata in the entries of the first and second data structures; and
  combining, by the system using the output data structure, the first set of tiles with the second set of tiles to produce an output page that includes the image with the edit applied to the image.

2. The method of claim 1, wherein the user input to edit the portion of the image comprises a user input to add a marking to the portion of the image.

3. The method of claim 1, wherein the user input to edit the portion of the image comprises a user input to modify the portion of the image.

4. The method of claim 1, further comprising storing the second set of tiles for the edit separately from the first set of tiles for the image, the method further comprising:
  applying the edit to other images using the second set of tiles and the second data structure.

5. The method of claim 1, wherein the output data structure comprises a first entry containing metadata of a first tile of the first set of tiles, and a second entry containing metadata of a second tile of the second set of tiles, the metadata in the first entry of the output data structure including position and orientation information of the first tile, and the metadata in the second entry of the output data structure including position and orientation information of the second tile.

6. The method of claim 5, wherein the position and orientation information in the first entry of the output data structure comprises position and orientation information from a respective entry of the first data structure, and the position and orientation information in the second entry of the output data structure comprises position and orientation information from a respective entry of the second data structure.

7. The method of claim 1, further comprising:
causing display of a preview of the image with the edit applied, the preview being at a lower resolution than a resolution of the image stored in memory;
receiving a user input to remove the edit from the image.

8. The method of claim 1, further comprising:
receiving a user input to modify the edit; and
updating the second data structure in response to the received user input to modify the edit.

9. The method of claim 1, further comprising compressing the first set of tiles and the second set of tiles, and storing the compressed first set of tiles and the compressed second set of tiles in a memory.

10. The method of claim 1, wherein a first entry of the output data structure contains metadata of a respective entry of the first data structure, and a second entry of the output data structure contains metadata of a respective entry of the second data structure, wherein the first entry of the output data structure further contains a pointer to the second entry of the output data structure.

11. A system comprising:
at least one processor to:
in response to an edit made with respect to a source image, create an edit image divided into a first set of tiles,
create a first attribute information data structure including entries containing metadata for respective tiles of the first set of tiles,
create a second attribute information data structure including entries containing metadata for respective tiles of a second set of tiles, the source image divided into the second set of tiles,
link the first and second attribute information data structures to produce an output attribute information data structure; and
create a page combining the source image and the edit image using the first and second attribute information data structures, wherein the combining of the source image and the edit image is based on the output attribute information data structure.

12. The system of claim 11, wherein the output attribute information data structure includes entries of the first and second attribute information data structures, each of the entries including linking information to link the entries of the first and second attribute information data structures.

13. The system of claim 11, wherein the edit includes adding a marking to a portion of the source image, or modifying a portion of the source image.

14. The system of claim 11, wherein the at least one processor is to apply the edit image to other source images using the first set of tiles and the first attribute information data structure.

15. The system of claim 11, wherein the metadata included in a first entry of the entries of the first attribute information data structure includes an orientation of a first tile of the first set of tiles, and the metadata included in a second entry of the entries of the second attribute information data structure includes an orientation of a second tile of the second set of tiles, and wherein the output attribute information data structure includes entries comprising the orientation of the first tile and the orientation of the second tile.

16. The system of claim 15, wherein the metadata included in the first entry further includes a position of the first tile, and the metadata included in the second entry further includes a position of the second tile, and the entries of the output attribute information data structure further comprise the position of the first tile and the position of the second tile.

17. The system of claim 11, wherein the output attribute information data structure includes a first entry containing metadata of an entry of the first attribute information data structure, and a second entry containing metadata of an entry of the second attribute information data structure, the first entry containing a pointer to the second entry in the output attribute information data structure.

18. An article comprising at least one non-transitory machine-readable storage medium storing instructions that upon execution cause a system to:
receive information relating to a user input to edit a portion of an image of an object, wherein the image is divided into a first set of tiles at least two of which are non-overlapping, and the image is represented by a first data structure including entries comprising metadata for respective tiles of the first set of tiles;
in response to the received information, create an edit image divided into a second set of tiles, and create a second data structure including entries comprising metadata for respective tiles of the second set of tiles;
create an output data structure by linking the entries of the first data structure and the entries of the second data structure, the output data structure including entries that link the first set of tiles and the second set of tiles; and
combine, using the output data structure, the first set of tiles with the second set of tiles to produce an output page that includes the image with the edit applied to the image.

19. The article of claim 18, wherein a first entry of the output data structure contains metadata of a respective entry of the first data structure, and a second entry of the output data structure contains metadata of a respective entry of the second data structure, wherein the first entry of the output data structure further contains a pointer to the second entry in the output data structure.

20. The article of claim 19, wherein the metadata of the first entry of the output data structure comprises an orientation of a tile of the first set of tiles, and the metadata of the second entry of the output data structure comprises an orientation of a tile of the second set of tiles.

* * * * *

UNITED STATES PATENT AND TRADEMARK OFFICE
CERTIFICATE OF CORRECTION

PATENT NO. : 10,210,642 B2
APPLICATION NO. : 15/327915
DATED : February 19, 2019
INVENTOR(S) : Perry V Lea et al.

Page 1 of 1

It is certified that error appears in the above-identified patent and that said Letters Patent is hereby corrected as shown below:

On the Title Page

Item (57), ABSTRACT, in Column 2, Line 2, delete "received,A" and insert -- received, --, therefor.

In the Claims

In Column 9, Line 36, in Claim 11, delete "tiles," and insert -- tiles; --, therefor.

In Column 9, Line 39, in Claim 11, delete "tiles," and insert -- tiles; --, therefor.

In Column 9, Line 43, in Claim 11, delete "tiles," and insert -- tiles; --, therefor.

Signed and Sealed this
Nineteenth Day of November, 2019

Andrei Iancu
*Director of the United States Patent and Trademark Office*